March 2, 1971  P. M. WHITFIELD  3,566,593
VIBRATOR MEANS
Filed Sept. 27, 1968  3 Sheets-Sheet 1
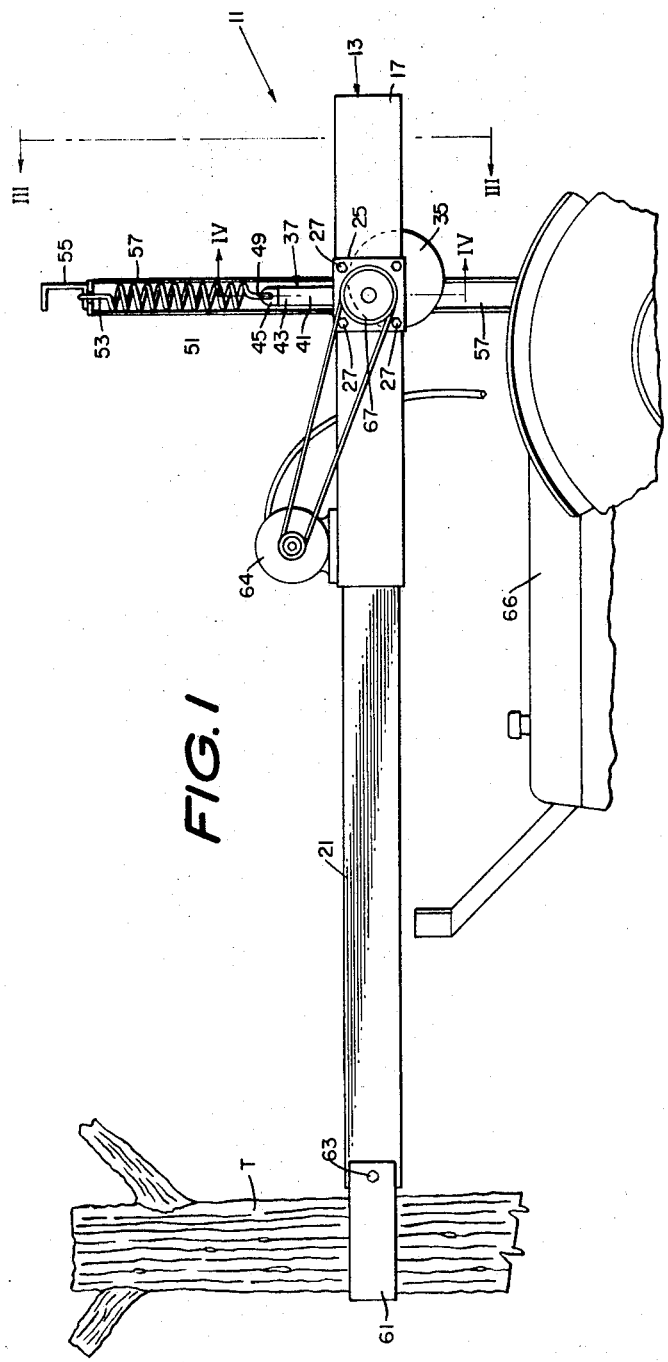
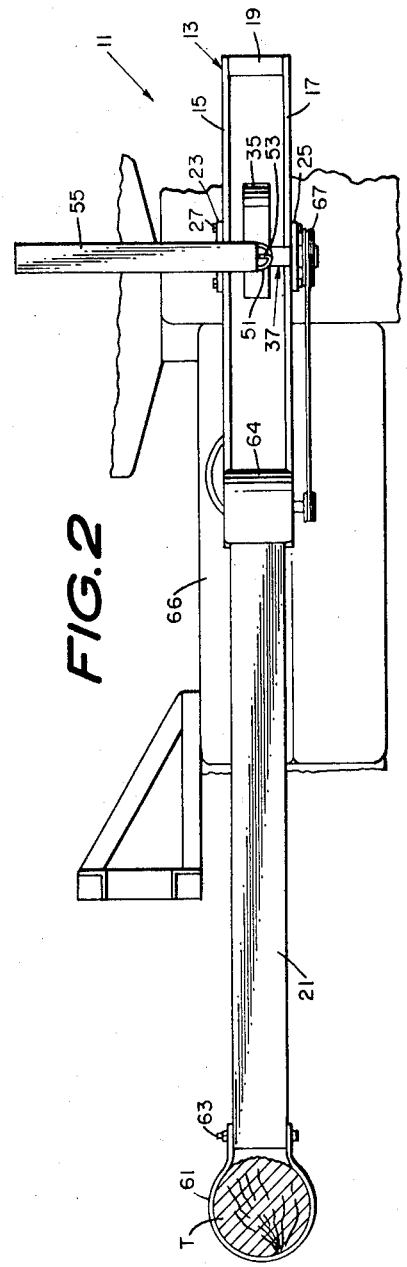
INVENTOR.
PAUL M. WHITFIELD
BY
Weatherford & Weatherford
Attys March 2, 1971 P. M. WHITFIELD 3,566,593
VIBRATOR MEANS
Filed Sept. 27, 1968 3 Sheets-Sheet 2

INVENTOR.
PAUL M. WHITFIELD
BY Weatherford & Weatherford
attys

March 2, 1971 P. M. WHITFIELD 3,566,593
VIBRATOR MEANS

Filed Sept. 27, 1968 3 Sheets-Sheet 3

INVENTOR.
PAUL M. WHITFIELD
BY
Weatherford & Weatherford
Attys

United States Patent Office 3,566,593
Patented Mar. 2, 1971

3,566,593
VIBRATOR MEANS
Paul M. Whitfield, Rte. 2, Box 320,
Jackson, Miss. 39209
Filed Sept. 27, 1968, Ser. No. 763,064
Int. Cl. A01g *19/00*
U.S. Cl. 56—328                                15 Claims

ABSTRACT OF THE DISCLOSURE

An apparatus for transmitting vibratory forces along an elongated boom, having a pivot at one of its ends and a single driven eccentric rotor adjacent the opposite end thereof. The rotary motion of the rotor is utilized for transmitting reciprocating vibrating forces through the boom and a pivot into a tree trunk, tree limb, or object as desired.

BACKGROUND OF THE INVENTION

(1) Field of the invention

The present invention relates to vibrator means and more particularly to vibrating means adapted to be utilized for selectively removing fruit and nuts from trees. The present invention further relates to vibrator means employing means for dissipating undesired vibratory impulses and directing the desired residual vibratory forces longitudinally through the invention into an object to be vibrated.

(2) Description of the prior art

There have been prior devices for use in vibratorily removing fruit and nuts from trees, but these prior devices, unlike the device of the present invention, have been dependent upon crank means, rotatable unbalanced weight means and a plurality of eccentric means mounted upon a common rotatable shaft.

Unlike these prior devices, the present invention utilizes unitary eccentric rotor means mounted upon a rotatable shaft to provide a plurality of vibratory forces upon the device when the eccentric rotor is revolvably actuated. The present invention further provides means for alining the axis of the eccentric rotor shaft with the center of percussion of the device to dissipate the undesired forces emitted therefrom and utilize the resultant, reciprocatingly related forces in a fore and aft manner along the longitudinal axis of the device.

SUMMARY OF THE INVENTION

The present invention provides a vibrator means, and more particularly a vibrator means for harvesting fruits and nuts from fruit and nut trees, utilizing an eccentric rotor mounted upon a rotatable shaft carried by an elongate boom. The boom is provided at its distal end with pivot means and means attached thereto for detachably engaging the boom end with a tree trunk or tree limb or the like. The elongated boom may be provided with resilient means affixed to its rotor carrying end for attachment to a fixed structure or suspended by its distal end as from a tree limb. The device may further be mounted upon compression means attached subjacent the rotor carrying end of the boom or may comprise a leaf spring, on which is mounted an eccentric rotor, supported at its rotor carrying end.

OBJECTS

The principal object of the present invention is to provide new and useful improvements in vibrator means.

Another important object of the present invention is to provide vibrator means which accomplish reciprocating motion utilizing a single eccentric rotor.

A further object of the present invention is to provide vibrator means adapted for mounting upon compression spring means.

Another object of the present invention is to provide vibrator means adapted for attachment to a leaf spring means.

A further object of the present invention is to provide vibrator means comprising a single eccentric rotatable rotor and means mounting and supporting the rotor.

Another object of the present invention is to provide vibrator means adapted for clampable attachment to an object to be vibrated.

A further object of the present invention is to provide vibrator means comprising a clamp, a boom, boom carrying means, and a rotatable eccentric rotor mounted substantially at the center of percussion of the supporting means; and Another object of the present invention is generally to improve the design, construction and efficiency of vibrator means.

DESCRIPTION OF THE DRAWINGS

The means by which the foregoing and other objects of the present invention are accomplished, and the manner of their accomplishment, will be readily understood from the following specification upon reference to the accompanying drawings, in which:

FIG. 1 is a side elevational view of the device of the present invention.

FIG. 2 is a top plan view of the device of FIG. 1.

DESCRIPTION OF THE PREFERRED EMBODIMENT

Figure 3:
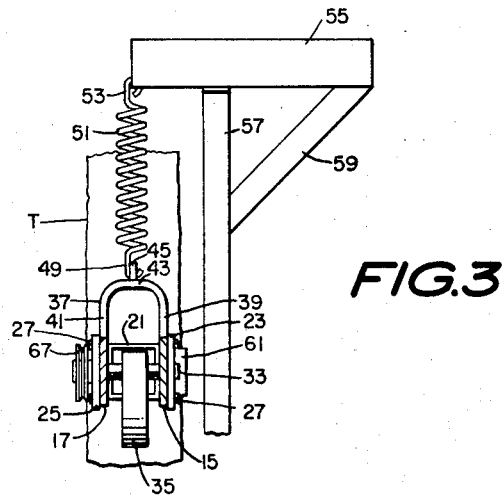
FIG. 3 is a fragmentary cross sectional view of the device of FIG. 1 as taken on the line III—III of FIG. 1.
Figure 4:
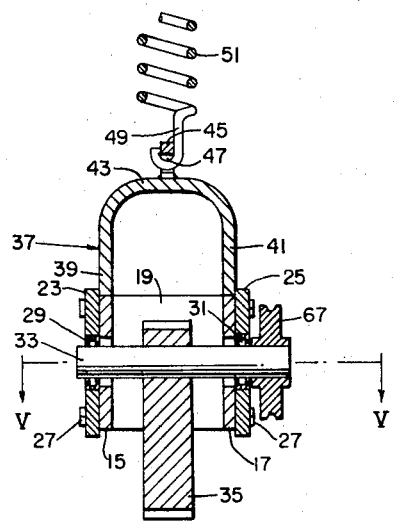
FIG. 4 is an enlarged fragmentary cross sectional view of the device of FIG. 1 taken as on the line IV—IV of FIG. 1.
Figure 5:
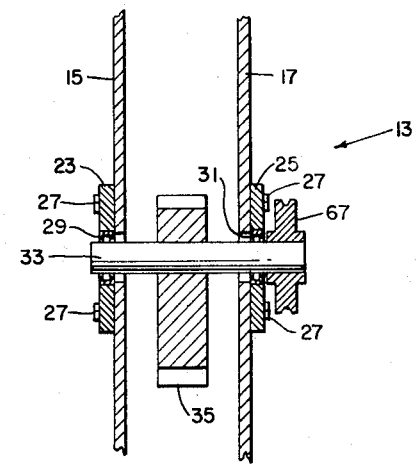
FIG. 5 is an enlarged fragmentary cross sectional plan view taken as on the line V—V of FIG. 4.

Referring now to the drawings in which the various parts are indicated by numerals, the present invention is provided with a vibrator means 11 comprising a frame 13 having a pair of substantially flat side members 15, 17 in subsatntially longitudinally extending, transversely spaced parallel alinement, spacer means 19 interposed between side members 15, 17 at the rearmost ends thereof to maintain the side members in spaced relation, and an elongated boom 21 rigidly attached to the forward ends of side members 15, 17 and interposed therebetween. The point of percussion of frame 13 lies along an imaginary line substantially perpendicular to side members 15, 17 and extending therethrough. A pair of oppositely spaced bearing blocks 23, 25 are attached to the outer surfaces of side members 15, 17 as by bolt means 27, and are provided with a pair of bearing members 29, 31 in substantially opposite axial alinement. A shaft 33 is rotatably journalled in bearing members 29, 31 spanning the space between side members 15, 17, and has its axis of rotation lying substantially on the center of percussion of the present device. A single rotor 35 is securely mounted on and rotatable with shaft 33 in off-center or eccentric relation to the shaft, and the rotor is positioned substantially centrally between frame side members 15, 17, the frame members being spaced apart to allow rotative movement of rotor 35 therebetween. Rotor means 35 is eccentrically secured upon shaft 33 in the manner of an off balance flywheel.

An inverted substantially U-shaped arbor 37 may be provided, the arbor having a pair of depending legs 39, 41 rigidly attached at their distal ends to the upper surfaces of side members 15, 17 as by welding, and a bight 43 integrally connected to the upper portions of legs 39, 41 somewhat above frame members 15, 17. Arbor 37 is provided with an upstanding tab 45 affixed thereto at substantially the center thereof and having an aperture 47 therein for the detachable engagement therewith of a hook 49 carried by the spring means 51. The uppermost end of spring means 51 is further provided with a deformed hook portion 53 for detachable engagement with an aperture formed in a substantially C-shaped beam 55 extending laterally from the vibrator means. Beam 55 is supported by upstanding beam means 57. C-shaped beam 55 is provided with brace means 59 affixed to one end thereof and depending angularly downwardly therefrom into rigid attachment with upstanding beam means 57 to form a substantially gibbet-like structure for supporting spring means 51 and frame 13 connected thereto. The lower end of beam means 57 are preferably rigidly attached to a tractor 60, a similar means of transport, or to a plate in substantial ground contact.

Boom 21 is provided at its forward end with clamp means 61 detachably affixed thereto as by a pivot bolt 63 for embraceable engagement with a selected nut or fruit bearing tree T. Clamp means 61 are preferably formed of a flexible material adapted to fit snugly around trees of varying circumference.

Shaft 33 extends outwardly beyond bearing block 25 and is adapted for coupling to a power means 64 to driving rotate shaft 33 and the attached eccentric rotor 35. Pulley means 67 attached to shaft 33 adjacent bearing block 25 is provided to couple shaft 33 and rotor 35 to be driven electrically, hydraulically or with other means of motive power.

It will be seen upon reference to the foregoing description of the preferred embodiment of the present invention and the accompanying drawings that when shaft 33 and the attached eccentric rotor 35 are rotatably actuated, the centrifugal forces created by the rotation of the eccentric rotor about the axis of shaft 33 are distributed outwardly therefrom. The forces exerted by the rotation of the rotor substantially along the longitudinal axis of frame 13 and boom 21 are transmitted to the frame 13 and the rigidly attached boom 21. With clamp 61 attached to an object to be vibrated, the vibratory forces induced therein by the rotation of eccentric rotor 35 through the combination of frame 13, boom 21 and pivot bolt 63 are reciprocatingly introduced in a selected amplitude to the object to be vibrated. The amplitude of vibration is variable and its extent is dependent upon the velocity of rotation of shaft 33 and the consequent rotation of rotor 35.

It will be further seen that the vertical forces induced into the frame at the point of percussion thereof by the rotation of shaft 33 and rotor 35 move equidistantly upwardly and downwardly and are thus dissipated equally into frame 13 to provide a substantially static condition therein with the resultant fore and aft forces moving longitudinally through frame 13 and boom 21.

It will be seen upon reference to the foregoing and the accompanying drawings, that the center of percussion of the device is rearwardly of the geometrical center thereof. The longitudinal vibratory forces moving alternately fore and after through boom 21 are transmitted to pivot bolt 63 and clamp means 61 to the tree trunk.

It will be additionally seen that spring 57 provides a means for resiliently supporting the device at the center of percussion thereof.

In the use of the device of the present invention clamp 61 encirclingly engaged with a selected section of the bole of the tree and fastened to the distal end of boom 21 as by pivot bolt 63. Shaft 33 is rotatably actuated by a suitable source of power 64 to drivingly rotate the attached eccentric rotor 35 and transform the centrifugal forces created thereby into a fore and aft vibratory motion carried by frame 13 and beam 21 whence it is imparted to the tree T shaking loose the nuts or fruit thereon for ground harvest.

The placement of the axis of shaft 33 upon that center of percussion of vibrator means 11 which causes the axis of oscillation to occur at the actual pivot eliminates all lateral movement at the pivot, to prevent damage to the bark and trunk of the tree T. The amplitude of vibration may be further reduced or increased by varying the rotative velocity of shaft 33 and attached eccentric rotor 35.

Figure 6:
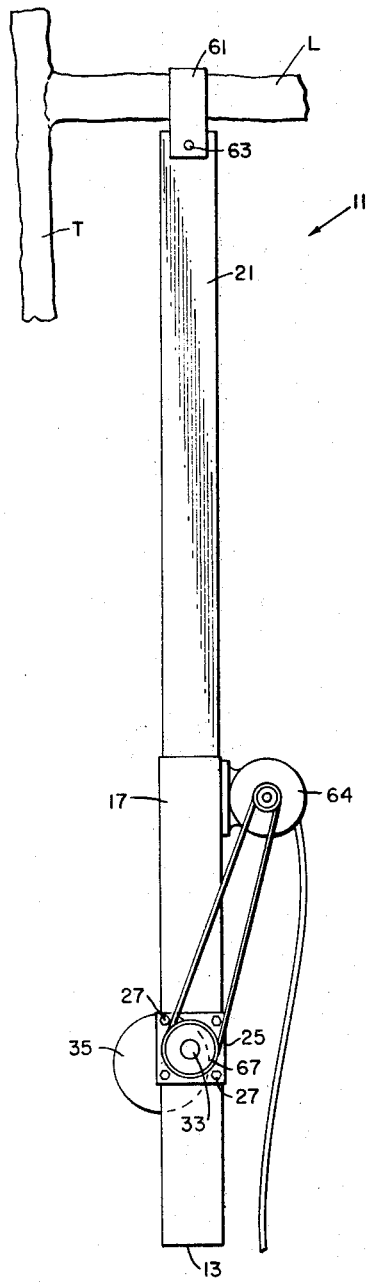
FIG. 6 is a side elevational view of a first alternate form of the device of FIG. 1 affixed to a tree limb.

In FIG. 6 of the drawings a modification of the structure is shown as an adaptation for utilization of the vibrator means to effect transmission of vibration in a vertical longitudinal direction along beam 21. In this modification, clamp 61 is affixed to a limb L of tree T, and the vibrator means including beam 21, frame 13 and power means 64, together with shaft 33 and eccentric rotor 35 which are driven by the power means, depend below limb L, with the entire device in effect being free floating and maintained in substantially vertical position by the force of gravity acting thereupon. It will be observed that shaft 33 is placed similarly to the placement of shaft 33 as shown, for example, in FIG. 1, so that the axis of the shaft is upon the center of percussion of the vibrator means at which the axis of oscillation occurs at the actual pivot and eliminates lateral movement at the pivot so that longitudinal vibrational forces are imparted to the object to be shaken such as limb L.

Figure 7:
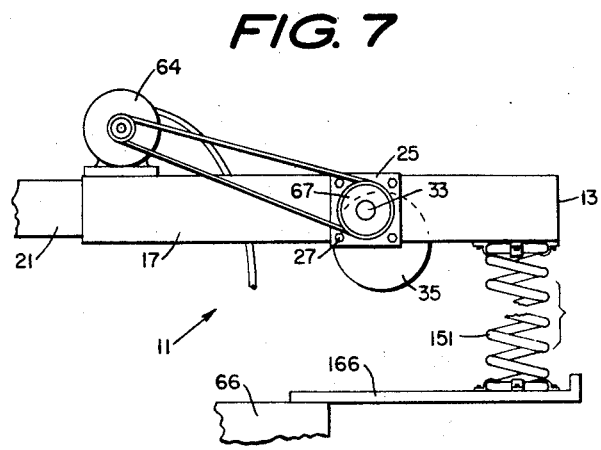
FIG. 7 is a fragmentary side elevational view of a second alternate form of the device of FIG. 1 mounted upon compression spring means.

In FIG. 7 of the drawings a further modification is illustrated, in which the rearmost end of frame 13 overlies and seats upon a compression spring 151, the lower end of spring 151 being supported in a suitable manner such as by a rigid bracket 166 which may be secured to and extend rearwardly from the body of the tractor 66. Rotor supporting shaft 33 is mounted as before upon the preferred center of percussion, and the frame and beam 21 are thus resiliently supported in a free floating manner similar to support thereof by tension spring 51 as illustrated, for example, in FIG. 1. The frame and beam may thus be held either in a horizontal disposition or in other position of angularity from the vertical for the satisfactory operation of the vibrator means.

Figure 8:
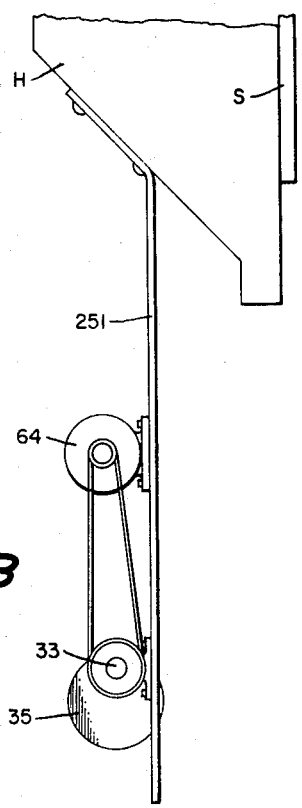
FIG. 8 is a fragmentary side elevational view of a third alternate form of the device of FIG. 1 attached to leaf spring means.

In FIG. 8 of the drawings yet another modification of the device is illustrated, in which, for purposes of illustration, vibrator means are shown as attached to an object to be vibrated or shaken, such as a hopper H which may be supported by a suitable support such as support means S. In this arrangement a leaf spring 251 is connected to hopper H and depends therebelow. Journalled upon the leaf spring is shaft 33 to which is mounted eccentric rotor 35, and drive for shaft 33 and rotor 35 is provided by a power means 64, which is illustrated as mounted upon leaf spring 251. In effect, leaf spring 251 also serves as the beam means in the device, and by the resilience of the leaf spring and its connection with the hopper, the beam is resiliently supported in a substantially floating manner with the shaft and eccentric rotor disposed on the center of percussion as heretofore described.

What is claimed is:

1. Vibrator means for imparting longitudinal vibrations to an object to be shaken while eliminating substantially all transverse vibrations, said vibrator means comprising:
 (A) relatively elongated beam means,
  (1) one end portion of said beam means being oscillatably engaged with said object to be shaken,
  (2) the other end of said beam means being spaced from said object to be shaken and being supported in free-floating condition, (B) a rotatable shaft carried by said beam means
(1) spanning across said beam means, intermediate the ends of said beam means proximate to said other end of said means,
(2) the axis of rotation of said shaft being positioned substantially at the center of percussion of said beam means to establish the incident axis of oscillation of said beam means at the point of engagement between said beam means and said object to be shaken, and
(3) journal means connected with said beam means rotatably supporting said shaft, (C) rotor means
(1) fixed to said shaft and rotatable therewith,
(2) said rotor means being disposed eccentric of said axis of shaft rotation, (D) power means
(1) said power means being drivingly coupled to said shaft effecting rotation of said shaft and said eccentric rotor,
(2) rotation of said shaft and rotor producing centrifugal vibrationary forces, the position of said axis of rotation substantially at said center of percussion substantially dissipating centrifugal vibrationary forces transverse to said beam means, said forces longitudinal of said beam means being transmitted along said beam means to said object to be shaken.

2. Vibrator means in accordance with claim 1, which include pivot means attached to said one end of said beam means, means contacting said object to be shaken pivoted to said pivot means, and the axis of oscillation being located at the point of attachment of said pivot means to the end of said beam means.

3. Vibrator means in accordance with claim 2, which said object contacting means comprise a band clampingly embracing said object.

4. Vibrator means in accordance with claim 1, in which said beam means include a frame located adjacent said other end of said beam means, said frame comprising a pair of longitudinally extending, spaced-apart plates, said journal means being carried by said frame and said shaft means spanning across the space between said plates.

5. Vibrator means in accordance with claim 1, in which said beam means other end is resiliently supported in free floating condition.

6. Vibrator means in accordance with claim 5, in which spring means resiliently support said beam means other end in free floating condition.

7. Vibrator means in accordance with claim 6, in which said spring means consist of compression spring means.

8. Vibrator means in accordance with claim 6, in which said spring means consist of tension spring means.

9. Vibrator means in accordance with claim 4, which include
(A) a substantially U-shaped arbor
(1) the legs of the U-shape of said arbor being respectively attached to said frame plates,
(2) the bight of said U-shape connecting said legs and spanning across the space between said plates, spaced away from said frame,
(B) tension spring means connected at one end to said bight and extending away from said arbor and said frame,
(C) spring supporting means, the other end of said tension spring means being connected to said spring supporting means to resiliently support said beam means other end in free floating condition.

10. Vibrator means for imparting substantially axially aligned vibratory forces to an object to be shaken while substantially eliminating all transverse vibrations, said vibrator means comprising:
(A) relatively elongated beam means,
(1) one end portion of said beam means being oscillatably suspended substantially vertically from the said object to be shaken,
(2) the other end of said beam means being downwardly spaced from said object to be shaken and being supported in free-floating condition, (B) a rotatable shaft carried by said beam means
(1) spanning across said beam means, intermediate the ends of said beam means proximate to said other end of said means,
(2) the axis of rotation of said shaft being positioned substantially at the center of percussion of said beam means at its location in the beam means substantially downwardly from said object to be shaken, and
(3) journal means connected with said beam means rotatably supporting said shaft, (C) rotor means
(1) fixed to said shaft and rotatable therewith,
(2) said rotor means being disposed eccentric of said axis of shaft rotation, (D) power means
(1) said power means being drivingly coupled to said shaft effecting rotation of said shaft and said eccentric rotor,
(2) the rotation of said shaft and rotor producing vibrationary forces, the position of said axis of rotation substantially at said center of percussion substantially dissipating vibrationary forces transverse of said beam means, and said forces induced axially of said beam means being transmitted along said beam means to said object to be shaken.

11. The vibratory means in accordance with claim 10, and wherein said power means is mounted to said beam means.

12. Vibrator means in accordance with claim 10, in which said beam means includes a frame located adjacent said other end of said beam means, said frame comprising a pair of longitudinally extending, spaced-apart plates, said journal means being carried by said frame and said shaft means spanning across the space between said plates.

13. Vibrator means for imparting substantially axially aligned vibrator forces to an object to be shaken while eliminating substantially all transverse vibrations, said vibrator means comprising:
(A) relatively elongated leaf spring means,
(1) one end portion of said leaf spring means being engaged with the said object to be shaken,
(2) the other end of said leaf spring means being spaced from said object to be shaken and being supported in free-floating condition, (B) a rotatable shaft carried by said leaf spring means
(1) spanning across said leaf spring means,
(2) journal means connected to said leaf spring means and rotatably supporting said shaft, and
(3) the axis of rotation of said shaft being positioned substantially at the center of percussion of said leaf spring means, (C) rotor means
(1) fixed to said shaft and rotatable therewith,
(2) said rotor means being disposed eccentric of said axis of shaft rotation, (D) power means
(1) said power means being drivingly coupled to said shaft effecting rotation of said shaft and said eccentric rotor,
(2) the rotation of said shaft and rotor producing vibrationary forces, the position of said axis of rotation substantially at said center of percussion substantially dissipating vibrationary forces transverse to said leaf spring means, with said forces axially of said leaf spring means being transmitted along said means to the object to be shaken.

14. Vibrator means in accordance with claim 13, wherein said power means is mounted to said leaf spring means.

15. Vibrator means for imparting substantially aligned vibrator forces to an object to be shaken comprising a beam means, said beam means being pivoted at one end to the object to be shaken, a rotatable shaft carried by said beam means proximate the other end of said beam means, the axis of rotation of said shaft being positioned substantially at the center of percussion of said beam means to establish the incident axis of oscillation of said beam means at its point of pivotal engagement to the object to be shaken, rotor means, said rotor means being eccentrically mounted to said rotatable shaft, and power means drivingly coupled to said shaft to effect the rotation of said shaft and said eccentric rotor whereby the rotation of said shaft and rotor produces axially aligned vibrations longitudinally of said beam means while dissipating the vibrationary forces transverse to said beam means.

References Cited

UNITED STATES PATENTS

| 3,392,517 | 7/1968 | Nye | 56—328 |
| 3,460,329 | 8/1969 | Overstreet, Jr. | 56—328 |

ROBERT PESHOCK, Primary Examiner